Sept. 20, 1971 W. KERN 3,606,020

RACK FOR ELECTRONIC MODULES

Filed Sept. 18, 1969

INVENTOR
WALTER KERN
BY Kenway, Jenney & Hildreth

ATTORNEYS

United States Patent Office 3,606,020
Patented Sept. 20, 1971

3,606,020

RACK FOR ELECTRONIC MODULES

Walter Kern, Cohasset, Mass., assignor to Teradyne, Inc., Boston, Mass.

Filed Sept. 18, 1969, Ser. No. 859,096
Int. Cl. A47f *7/00;* H02b *1/04*
U.S. Cl. 211—26 14 Claims

ABSTRACT OF THE DISCLOSURE

A rack for supporting a plurality of electronic component modules in an array provides maximum accessibility to the side panels of each module. The rack includes a skeletal frame having vertical, parallel bars arranged to embrace, and be secured to, the corners of each module which is supported by the rack. The lateral span between adjacent bars is unobstructed so that each side panel of each module is exposed fully. The vertical bars are rigid and are secured to each other by means of upper and lower bracing elements which connect together the upper ends of the bars and the lower ends of the bars and do not interfere with the supported modules. When the modules are mounted in the rack, panels span adjacent vertical bars so that the side panels cooperate with the cross braces to define a rigid triangular structure.

BACKGROUND AND SUMMARY OF THE INVENTION

This invention relates to computer racks or similar structures for supporting a number of electronic modules in a compact array to provide maximum access to each of the modules in the array.

It has been the commonly accepted practice in the art to arrange a stack of modular electronic packages in cabinets or enclosures so that a selected face of each of the modules is exposed along a single side or panel of the cabinet. Although a number of practical difficulties result from the utilization of the conventional packaging arrangement, there has been little departure from it. Among these difficulties are that the conventional cabinets are bulky and must be of heavy construction because they alone support the full load of the modules. Of greater importance is the arrangement in which the modules must be mounted in the cabinets. The customary arrangement is to secure the modules in the cabinets so that only one panel of each module is exposed. The remaining panels or faces of each module are enclosed completely within the cabinet which impairs the accessibility to the interior circuitry of the modules. Repair, replacement or inspection of the interior ciricuitry of the modules is cumbersome in that it frequently is required to remove the module entirely from the cabinet. Furthermore, although the conventional cabinets support modules in a vertical stack or dense array, it is inconvenient for a number of operators or technicians to have simultaneous access to the panels of the modules because the panels are exposed only along one surface of the cabinet.

In order to avoid the foregoing difficulties the instant invention provides a rack of simple and strong construction which permits a compact, dense array to be obtained with improved accessibility. The rack supports the modules so that selected side panels of the modules face in different directions about the rack. This enables a number of operators to be stationed around the rack so that each operator may have complete, unhindered access to any given panel.

The foregoing advantages are achieved by providing a rack of skeletal construction in which the modules themselves are employed to provide some of the strength necessary for their own support. The skeletal frame occupies little space and does not interfere with access to the side panels of the modules. Additionally, the construction employed permits the rack to be disassembled or assembled easily and thus be transported easily and economically.

Also among the advantages of the invention is that when modules are supported in the rack, should any module need repair or inspection, rapid access may be had to the interior circuitry of each module, which results in minimal downtime. There is no need to pull the modules completely out of the rack or to unfasten cabinet panels as had been done in the prior art.

Additionally, the rack permits the operators or technicians to be seated comfortably in front of the panels of the modules. The rack thus is useful particularly in a component testing station although it may be used in any environment where high module density, low cost and full accessibility to the modules are required.

The invention now will be described in greater detail with reference to the accompanying drawings wherein.

Figure 1:
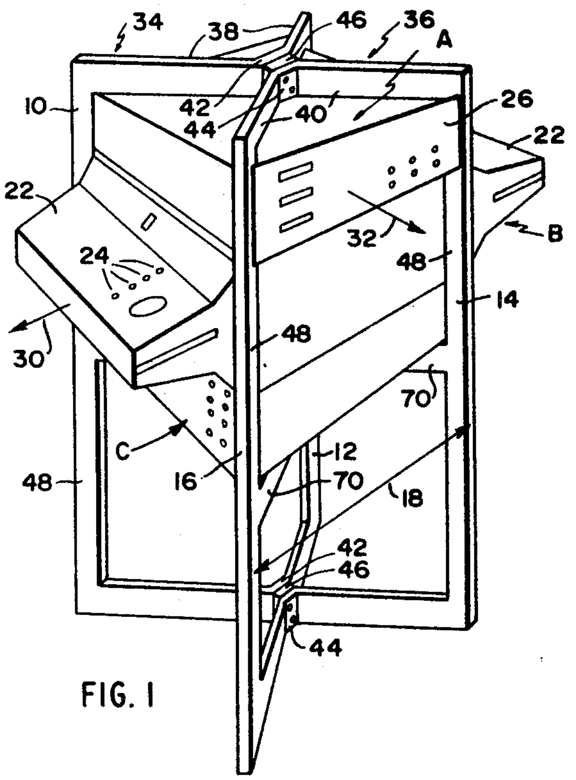
FIG. 1 is an illustration of the racks and supported modules.
Figure 2:
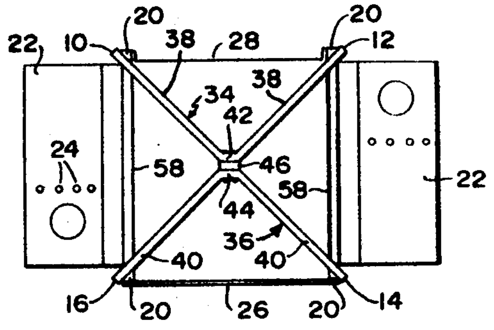
FIG. 2 is a plan view of the top of the racks shown in FIG. 1.
Figure 4:
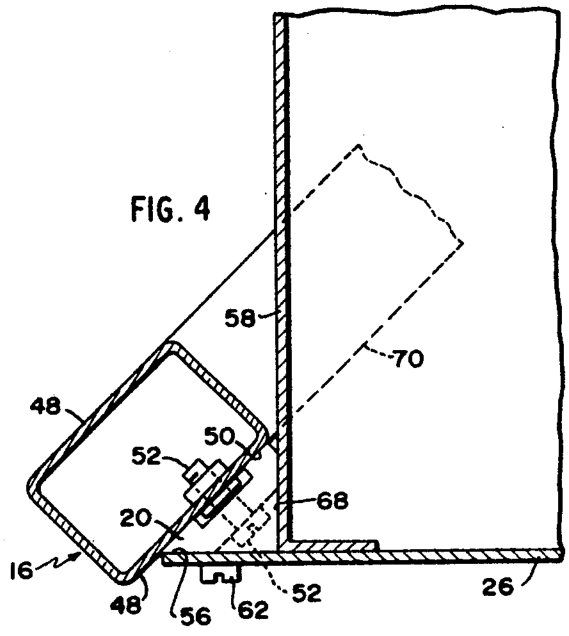
FIG. 4 is an enlarged cross-sectional view of the connection between the racks and one corner of a module.

As shown in FIGS. 1 and 2 the rack includes four vertical, parallel bars 10, 12, 14, 16 which are interconnected and secured both at their lower ends and upper ends to make a rigid structure. Additionally, in some instances the rack may be provided with bracing elements at its midportion. In the illustrative embodiment the vertical bars are arranged in a generally square plan configuration with the lateral span 18 between adjacent heightwise bars being unobstructed and adapted to receive the component modules. The free spaces between the bars 10, 13, 14, 16 permit unhindered placement of the modules in the rack and, after such placement, the side panels of the modules are accessible completely about the rack.

The bars are dimensioned with respect to the modules so that when the modules are in the rack their corners are disposed in proximity to the bars and may be secured thereto. In accordance with the invention, the rack permits selected faces of each module to be disposed between any adjacent pair of bars. For example, as shown, the rack supports three modules A, B, and C in a vertical stack. The corners of each module are located at the bars and are secured thereto by special connecting elements 20 described below. By way of example, the middle module B may have control panels 22 on opposite ends thereof, as might be desirable in a component testing station. Each of the panels 22 may have connectors or sockets 24 receptive to the components which are to be tested, together with appropriate monitoring and testing instrumentation and controls. This arrangement permits two operators to be located at the same station, one on each side of the rack. The upper and lower modules A and C which, may contain associated circuitry, are oriented in the rack so that selected faces 26, 28 are exposed at the other, opposite sides of the rack. This arrangement permits free unhindered access to the faces 26, 28 of the upper and lower modules A, C without interfering with the operators or technicians located at the control panels 22 of the middle module B. The arrangement, as shown, permits the modules to be mounted or removed simply along the directions indicated by the arrows 30, 32. Access to each module is unhindered and a station may be provided in which four operators are located about the racks, each one attending to one face or panel of one module.

The rack itself is constructed from a pair of elements 34, 36 which in the illustrative embodiment, are identical and may be formed from solid or tubular stock. Each element 34, 36 includes a pair of parallel bars 10 and 12, and 14 and 16, respectively, and has a bracing beam 38, 40, respectively secured to and extending from each end of the bars 10, 12, 14, 16. The other, inward-facing ends of the beams 38—38 and 40—40 are joined together at an angle to define an apex 42, 44. The apexes of the elements 34, 36 are connected, as shown, so that when the rack is assembled the beams 38—38 and 40—40 extend in a generally outward direction from the apexes with the rack being of generally rectangular form as viewed in plan in FIG. 2.

Figure 5:
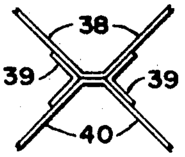
FIG. 5 is an illustration of an alternative method of assembling the rack.

In order to facilitate assembly of the two elements 34 and 36 at the pair of apexes 42 and 44 at the upper end and at the lower end of the rack, a spacer or block 46 is interposed between each pair of connected apexes. The connection may be made by bolts passing through appropriate holes formed at the apexes 42, 44 and through the spacer blocks 46. Alternatively the holes may be tapped to receive screws in lieu of the bolts. It should be noted that the width of the spacer block 46, i.e. the block dimension between two interconnected apexes 42 and 44, may be varied to vary the length of the rack so that it may accommodate modules of varying sizes. Although the use of spacer block 46 is preferred, the elements 34, 36 may be joined by conventional angle brackets 39 which may be secured, as shown in FIG. 5, to the adjacent beams 38, 40.

Figure 3:
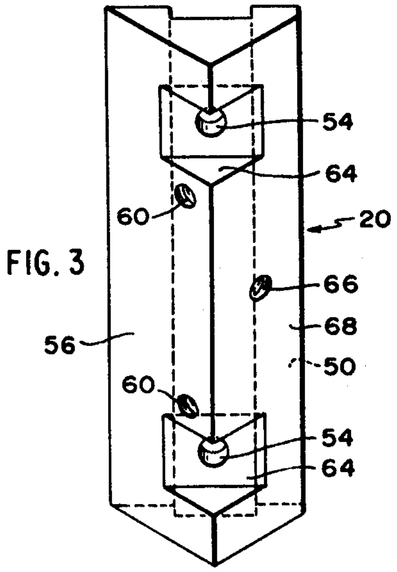
FIG. 3 is an illustration of a typical connector used to fasten the modules to the rack.

When the rack is assembled, the lateral faces 48 of adjacent vertical bars are disposed at an angle to each other. Special connectors 20, shown in FIG. 3, are provided to secure the modules to and between the vertical bars of the rack. The connectors preferably are of generally right triangular prismatic shape and are secured to the bars at the desired height to accommodate the particular modules. Each connector block 20 is mounted so that its hypotenuse face 50 bears against the surface 48 of its associated vertical bar, the connector being secured to the bar by means of bolt 52 passed through hole 54 formed in the connector and selected holes formed along the vertical bar. Thus, when a pair of connectors 20 is mounted to adjacent vertical bars, their outwardly facing surfaces 56 are arranged in substantial planar alignment and define planar surfaces to which the front panels 26 may be secured. Threaded inserts 60 are provided in the connector block 20 to receive screws 62 for fastening the panel modules. A slot 64 preferably is formed at the edge of the connector block opposite the face 50 so that the bolt 52 employed to secure the module to the connector block 20 is recessed. An additional threaded insert 66 is provided in the third face 68 of the triangular block 20 to enable it to be used on either side of a given vertical bar to mount any of the modules in the rack. It should be noted, in this regard, that the preferred embodiment of the invention employs elements 34, 36 in which the bracing beams 38 or 40 of any element are arranged at right angle to each other so that adjacent faces 48 of any two adjacent vertical bars similarly will be disposed in perpendicular planes. This arrangement enables identical connectors 20 to be used on any face 48 of any of the vertical bars 10, 12, 14, 16.

Also among the advantages of the invention is that, before the modules have been secured, the rack resembles a pair of crossed frames, i.e. one such frame is formed by the non-adjacent vertical bars 12 and 16 and the beams 38 and 40 connected between these bars at each of two locations therealong, and there are no connective elements spanning adjacent bars. When a module is secured, at its corners, to the bars, the side panels of the modules serve further to brace the rack by defining a rigid triangular brace between a pair of adjacent cross beams and a panel disposed between those cross beams. For example, as hown in FIGS. 1 and 2 the upper brace 40 and the panel 26 of module A define such a triangular brace.

Further rigidity may be provided by employing cross beams 70 disposed at the mid-height of the rack. Although the middle cross beams 70 are not necessary, they do add to the rigidity of the rack without affecting materially the available space within the rack. The cross beams 70 preferably are located at table height.

It should be noted further that when the modules are to be attended by a seated operator or technician, the lowermost module C should be high enough to provide adequate leg room. The space beneath the lowermost module is free and unhindered to provide comfortable leg room for the operator and thus reduce fatigue.

The rack described herein may be disassembled into its component parts 34, 36 and may be shipped or transported simply and at low cost. The disassembled elements 34 and 36, each with two bars 10 and 12, and 14 and 16, respectively, and the beams 38 and 40 attached to them, may be nested with each other for compact transportability.

Additionally, the rack described heerin is of low cost, sturdy and lightweight construction; is versatile in that it may be employed to accommodate modules of varying sizes; and is comfortable for the operators as well as providing excellent access to each module in the rack. Furthermore a number of computer racks of the type described herein may be arranged alongside each other and may be secured together in a row, if desired.

It should be understood that the foregoing disclosure is intended merely to be illustrative of the invention and that other embodiments and modifications will be apparent to those skilled in the art without departing from its spirit. For example, although in the preferred embodiment the rack is disclosed as being constructed from a number of elements, it may be formed from a unitary one-piece frame which may be welded together. Additionally, snap-on covers orp anels may be provided over the sides of the computer rack for aesthetic purposes, if desired.

Having thus described my invention, what I desire to claim and secure by Letters Patent is:

1. A modular console including a number of modular components disposed in a heightwise array comprising (A) four vertical bars disposed in a parallel, rectangular arrangement relative to each other, (B) upper bracing means interconnecting upper ends of said vertical bars, said bracing means including a pair of bracing beam members in a cross-shape, each bracing beam member being secured at its ends to the upper ends of two vertical bars diagonally opposite each other in said rectangular arrangement, (C) lower bracing means interconnecting lower ends of said vertical bars, said lower bracing means including a pair of bracing beam member in a cross-shape, each bracing beam member being secured at its ends to the lower ends of two vertical bars diagonally opposite each other in said rectangular arrangement, (D) means securing at least two corner regions of each of said modules to two vertical bars, between said upper and lower bracing means, each module having a panel between said two corners thereof, each panel spanning adjacent vertical bars and cooperating with said bracing means to define a rigid truss of triangular plan configuration.

2. Apparatus as defined in claim 1 wherein said means securing the corner regions of each of said modules to two vertical bars comprises a connector element secured to each of said two bars, said connector element having a face thereof disposed against a panel of one of said modules in the corner region of said module, said connector element receiving a fastener securing said panel thereto.

3. Apparatus as defined in claim 2 wherein said connector element is of a generally right triangular prismatic shape and wherein the hypotenuse surface of said connector element engages said bar and wherein a further surface of said triangular shape forms said aforementioned face.

4. A rack of mounting modularized comopnents comprising (A) a plurality of parallel, vertical bars disposed at the periphery of an open space, (B) upper, horizontally-extending bracing elements secured to and interconnecting the upper end of said parallel bars, (C) lower, horizontally-extending bracing elements secured to and interconnecting said parallel bars at a location thereon spaced below said upper bracing elements, (D) said bars and said upper bracing elements and lower bracing elements defining said open space to extend without interruption and free of rack-forming members within the volume bounded by said bars, said upper element and said lower elements, and for receiving at least one modularized component, and (E) means for securing at least one modularized component to said bars with the volume of the component disposed at least partly within said space.

5. A rack as defined in claim 4

(A) wherein said upper bracing elements comprise a plurality of bracing beams extending outwardly from a common connection point which is disposed centrally of said bars, the outer end of each upper beam being connected to the upper end of one of said bars, and (B) wherein said lower bracing elements comprise a plurality of bracing beams extending outwardly from a common connection point which is disposed centrally of said bars, the outer end of each lower beam being connected to one of said bars.

6. A rack for supporting component modules comprising (A) a pair of frames, each frame having (1) a pair of spaced, parallel, vertically-extending bars, and (2) a V-shaped, angle bracing beam associated with each end of each pair of bars and interconnecting said bars of each pair thereof, thereby defining upper and lower apexes attached to each pair of spaced bars, and (B) frame-joining means securing said upper apexes of said paired frames to each other and securing said lower apexes of said paired frames to each other, said joining means being free of structure extending between said joined upper apexes and said joined lower apexes, and said bars and bracing means and joining means forming open storage space therebetween free of rack-forming members.

7. A rack as defined in claim 6 in which said frame-joining means includes a spacer block, interposed between each pair of joined apexes.

8. A rack as defined in claim 6 in which said frame-joining means includes a spacer block interposed between each pair of joined apexes, the thickness of each spacer block between said pair of frames controlling said storage space within said rack.

9. A rack for supporting component modules, each of which has a panel member, said rack comprising (A) a pair of frames, each frame having (1) a pair of spaced, parallel upstanding bars, (2) a V-shaped, angle bracing beam associated with each end of each pair of bars and interconnecting said bars of each pair thereof, thereby defining upper and lower apexes attached to each pair of spaced bars, (B) means securing said upper apexes of said paired frames to each other and securing said lower apexes of said paired frames to each other, (C) means on said bars for securing said component modules to said bars with a panel of each module spanning between a pair of said bars adjacent each other, two said securing means on a pair of adjacent bars being arranged to secure a panel of each module thereto.

10. A rack for supporting units of equipment, said rack comprising (A) first, second, third and fourth elongated and rigid bar members oriented with the lengths thereof extending vertically and disposed at the corners of a quadrilateral configuration as viewed in a horizontal plane, with said first and third bar members located at a first pair of diagonally opposite corners of said configuration and said second and fourth bar members located at a second pair of diagonally opposite corners, (B) at least first and second interconnecting members, (1) each of which interconnects said four bar members along a generally horizontal plane, with said first interconnecting member being vertically spaced above said second interconnecting member, (2) each interconnecting member having first, second, third and fourth beam portions, each of which connects at one end thereof to the same-number bar member and is joined at the other end thereof to said other beam portions of the same interconnecting member, and (C) means for removably and replaceably mounting a unit of equipment in said rack attached to said rack at at least two said bar members.

11. A rack as defined in claim 10 in which each interconnecting member has said first and third beam portions thereof aligned between said first and third bar members, and has said second and fourth beam portions thereof aligned between said second and fourth bar members.

12. A rack as defined in claim 11 in which said beam portions of each interconnecting member are arranged in a cross-shaped configuration.

13. A rack as defined in claim 10 in which (A) each bar member has a pair of opposed and parallel faces extending along the length thereof, (B) said first and third bar members are oriented with said opposed faces thereof parallel to each other and parallel to a first vertical plane passing through said first pair of diagonally opposite corners, and (C) said second and fourth bar members are oriented with said opposed faces thereof parallel to each other and parallel to a second vertical plane passing through said second pair of diagonally opposite corners.

14. A rack as defined in claim 13 in which each interconnecting member has said first and third beam portions aligned between said first and third bar members along said first vertical plane and has said second and fourth beam portions aligned between said second and fourth bar members along said second vertical plane.

References Cited

UNITED STATES PATENTS

| | | | |
|---|---|---|---|
| 1,572,340 | 2/1926 | Warren | 211—149X |
| 2,986,283 | 5/1961 | Bjorncrantz | 211—134 |
| 3,471,029 | 10/1969 | Dolan | 211—13 |

RAMON S. BRITTS, Primary Examiner

U.S. Cl. X.R.

211—133; 317—99